(12) United States Patent
Tang

(10) Patent No.: US 11,088,941 B2
(45) Date of Patent: Aug. 10, 2021

(54) METHOD FOR TRANSMITTING DATA, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/496,832

(22) PCT Filed: Mar. 23, 2017

(86) PCT No.: PCT/CN2017/077931
§ 371 (c)(1),
(2) Date: Sep. 23, 2019

(87) PCT Pub. No.: WO2018/170855
PCT Pub. Date: Sep. 27, 2018

(65) Prior Publication Data
US 2020/0322256 A1 Oct. 8, 2020

(51) Int. Cl.
*H04W 28/04* (2009.01)
*H04L 12/707* (2013.01)
*H04W 28/02* (2009.01)

(52) U.S. Cl.
CPC ......... *H04L 45/24* (2013.01); *H04W 28/0236* (2013.01); *H04W 28/04* (2013.01)

(58) Field of Classification Search
CPC ......... H04L 1/08; H04L 45/24; H04L 12/707; H04L 29/06; H04W 28/02;
(Continued)

(56) References Cited

U.S. PATENT DOCUMENTS 8,988,994 B2  3/2015  Kumar
8,989,004 B2  3/2015  Zhang
(Continued)

FOREIGN PATENT DOCUMENTS

CN   102227934 A   10/2011
CN   103201977 A   7/2013
(Continued)

OTHER PUBLICATIONS

Ericsson: "Further aspects of data duplication in PDCP layer", 3GPP Draft; R2-1700834—Further Aspects of Data Duplication in PDCP Layer, 3rd Generation Partnership Project (3GPP), Mobile Competence Centre ; 650, Route Des Lucioles ; F-06921 Sophia-Antipolis CED, vol. RAN WG2, no. Athens, Greece; Feb. 13, 2017-Feb. 17, 2017 Feb. 12, 2017 (Feb. 12, 2017), XP051211616, Retrieved from the Internet: URL:http://www.3gpp.org/ftp/Meetings_3GPP_SYNC/RAN2/Docs/ [Retrieved on Feb. 12, 2017] * the whole document *.

(Continued)

*Primary Examiner* — Nathan S Taylor
(74) *Attorney, Agent, or Firm* — Ladas & Parry LLP

(57) ABSTRACT

Disclosed are a method for transmitting data, a terminal device, and a network device. The method comprises: a first terminal device determining a transmission method for a packet data convergence (PDCP) protocol data unit (PDU), the transmission method comprising a replication-based data transmission method or a single-link based data transmission method; and the first terminal device transmitting the PDCP PDU to a second terminal device or a network device according to the transmission method determined for the PDCP PDU.

26 Claims, 3 Drawing Sheets

(58) Field of Classification Search
CPC . H04W 28/0236; H04W 28/04; H04W 76/15; H04W 72/04; H04W 80/02
USPC .......................................................... 370/310
See application file for complete search history.

(56) References Cited

U.S. PATENT DOCUMENTS

| | | | |
|---|---|---|---|
| 2010/0322194 A1* | 12/2010 | Hu | H04W 36/023 370/331 |
| 2012/0057560 A1* | 3/2012 | Park | H04L 1/189 370/329 |
| 2012/0281564 A1 | 11/2012 | Zhang | |
| 2013/0121301 A1* | 5/2013 | Kim | H04W 24/10 370/329 |
| 2013/0185062 A1 | 7/2013 | Krishnan et al. | |
| 2013/0185084 A1 | 7/2013 | Rajendran et al. | |
| 2014/0301188 A1* | 10/2014 | Koskinen | H04L 47/34 370/230 |
| 2014/0301362 A1* | 10/2014 | Koskinen | H04L 1/1838 370/331 |
| 2014/0341013 A1 | 11/2014 | Kumar | |
| 2015/0146614 A1* | 5/2015 | Yu | H04L 69/161 370/328 |
| 2018/0098250 A1* | 4/2018 | Vrzic | H04W 36/0016 |
| 2018/0279262 A1* | 9/2018 | Babaei | H04W 72/04 |
| 2018/0279358 A1* | 9/2018 | Babaei | H04W 72/0453 |
| 2018/0368132 A1* | 12/2018 | Babaei | H04W 80/02 |
| 2019/0327641 A1* | 10/2019 | Mok | H04W 4/40 |
| 2020/0068437 A1* | 2/2020 | Lohr | H04L 1/1874 |

FOREIGN PATENT DOCUMENTS

| | | |
|---|---|---|
| CN | 103428246 A | 12/2013 |
| CN | 105450367 A | 3/2016 |
| EP | 3190735 A1 | 7/2017 |
| JP | 2019530355 A | 10/2019 |
| RU | 2550034 C2 | 5/2015 |
| WO | 2016034041 A1 | 3/2016 |
| WO | 2017023438 A1 | 2/2017 |
| WO | 2018059557 A1 | 4/2018 |

OTHER PUBLICATIONS

Ericsson: "Data duplication and link selection for URLLC in NR", 3GPP Draft; R2-1700428—Data Duplication and Link Selection for URLLC in NR, 3rd Generation Partnership Project (3GPP), Mobile Competence Centre ; 650, Route Des Lucioles ; F-06921 Sophia-Antipolis C, vol. RAN WG2, no. Spokane, Wa; Jan. 17, 2017-Jan. 19, 2017 Jan. 17, 2017 (Jan. 17, 2017), XP051211006, Retrieved from the Internet URL http://www.3gpp.org/ftp/Meetings_3GPP_SYNC/RAN2/Docs/ [retrieved on Jan. 17, 2017] * the whole document *.
"Packet duplication in CA", 3GPP Draft; R2-1701542 Packet Duplication for CA, 3rd Generation Partnership Project (3GPP), Mobile Competence Centre ; 650, Route Des Lucioles ; F-06921 Sophia-Antipolis Cedex ; France, vol. RAN WG2, no. Athens, Greece; Feb. 13, 2017-Feb. 17, 2017 Feb. 12, 2017 (Feb. 12, 2017), XP051212166, Retrieved from the Internet: URL:http://www.3gpp.org/ftp/Meetings_3GPP_SYNC/RAN2/Docs/ [retrieved on Feb. 12, 2017] * the whole document *.
Supplementary European Search Report in the European application No. 17901580.5, dated Jan. 30, 2020.
English translation of the Written Opinion of the International Search Authority in the international application No. PCT/CN2017/077931, dated Oct. 30, 2017.
International Search Report in the international application No. PCT/CN2017/077931, dated Oct. 30, 2017.
Written Opinion of the International Search Authrarity in the international application No. PCT/CN2017/077931, dated Oct. 30, 2017.
First Office Action of the European application No. 17901560.5, dated Oct. 21, 2020.
First Office Action of the Canadian application No. 3057382, dated Nov. 10, 2020.
Second Office Action of the Chilean application No. 201902092, dated Dec. 18, 2020.
InterDigital Communications, Packet Duplication at PDCP, 3GPP TSG-RAN WG2 Meeting #97, Athens, Greece, R2-1701186, Feb. 17, 2017 (Feb. 17, 2017), Section 2, pp. 1-3.
First Office Action of the Chinese application No. 201911302320.1, dated Nov. 3, 2020.
First Office Action of the Indian application No. 201917039172. dated Feb. 25, 2021.
First Office Action of the Japanese application No. 2019-552159. dated Mar. 19, 2021.
First Office Action of the Korean application No. 10-2019-7027898, dated Mar. 26, 2021.
First Office Action of the Singaporean application No. 11201908814T, dated Mar. 15, 2021.
First Office Action of the Taiwanese application No. 107105086, dated Mar. 31, 2021.
Ericsson; "Data duplication in lower layers (HARQ)", 3GPP TSG-RAN WG2 #97, Tdoc R2-1702032, Athens, Greece, Feb. 13-17, 2017.
Notice of Allowance of the Russian application No. 2019133784, dated Jun. 11, 2020.
First Office Action of the Chilean application No. 201002692, dated Aug. 19, 2020.

* cited by examiner

METHOD FOR TRANSMITTING DATA, TERMINAL DEVICE, AND NETWORK DEVICE

RELATED APPLICATION

This application is an application under 35 U.S.C. 371 of International Application No. PCT/CN2017/077931 filed on Mar. 23, 2017, the entire contents of which are incorporated herein by reference.

TECHNICAL FIELD

The present disclosure relates to the field of communication, and in particular to a method for data transmission, a terminal device and a network device.

BACKGROUND

In a carrier aggregation scenario, a Packet Data Convergence Protocol (PDCP) layer in a transmitter may support data duplication, i.e., a PDCP Protocol Data Unit (PDU) is duplicated into two copies (or multiple copies) to improve the reliability of data transmission. In the related art, a data duplication transmission manner is directly adopted, which results in the extremely low resource utilization.

SUMMARY

In view of this, the disclosure provides a method for data transmission, a terminal device and a network device, which facilitates to balance a relationship between the resource utilization and the data transmission reliability.

A first aspect provides a method for data transmission, which includes the following operations. A first terminal device determines a transmission manner of a PDCP PDU. The transmission manner includes a data duplication transmission manner or a single-link transmission manner. The first terminal device sends the PDCP PDU to a second terminal device or a network device according to the transmission manner of the PDCP PDU.

By dynamically switching the transmission manners of data, the resource utilization rate and the data transmission reliability can be effectively balanced.

In at least one embodiment, the solutions in the embodiment of the disclosure may be applied to an uplink data transmission scenario, and may also be applied to a Device-to-Device (D2D) communication scenario.

The data duplication transmission manner indicates that data duplication transmission is used by a PDCP and one PDCP PDU is duplicated into a plurality of copies to be respectively transmitted on a plurality of links. The single-link transmission manner indicates that the data duplication is not used by the PDCP, i.e., the PDCP PDU does not duplicate the data, one PDCP PDU may be transmitted once in one link and may also be divided into a plurality of portions to be transmitted on a plurality of links. In other words, the determination of the transmission manner of the PDCP PDU depends on whether the data duplication transmission function is used by the PDCP.

In at least one embodiment, the PDCP PDU may be a service having a high reliability requirement on the data transmission. That is, when the PDCP PDU of the service is required to be transmitted, it is necessary to determine whether the PDCP PDU is duplicated. For other PDCP PDUs without the high demand on the data transmission, this transmission manner may not be determined, and the single-link transmission manner is adopted directly for transmission.

In a possible implementation manner, the operation that the first terminal, device determines the transmission manner of the PDCP PDU includes the following action. The first terminal device determines the transmission manner of the PDCP PDU according to channel quality information of at least one link.

The channel quality information of the link may include the following information: a Channel quality indicator (CQI), the number of times of retransmission scheduling within a certain time period, the number of times of continuous initial transmission scheduling within a certain time period or a Modulation and Coding Scheme (MCS), etc.

The channel quality of the link is associated with the transmission manner, such that the relationship between the resource utilization rate and the data transmission reliability can further be balanced.

In a possible implementation manner, the channel quality information of the at least one link includes a number of times of retransmission scheduling on the at least one link within a first time period, a number of times of continuous initial transmission scheduling on the at least one link within a second time period or an MCS value of the at least one link. The operation that the first terminal device determines the transmission manner of the PDCP PDU according to the channel quality information of the at least one link includes the following action. The first terminal device determines the transmission manner of the PDCP PDU according to the number of times of retransmission scheduling on the at least one link within the first time period, the number of times of continuous initial transmission scheduling on the at least one link within the second time period or the MCS value of the at least one link.

In a possible implementation manner, the operation that the first terminal device determines the transmission manner of the PDCP PDU according to the number of times of retransmission scheduling on the at least one link within the first time period includes the following action. In condition that the number of times of retransmission scheduling on any of the at least one link is less than or equal to a first threshold, the first terminal device determines the transmission manner of the PDCP PDU as the single-link transmission manner; or in condition that the number of times of retransmission scheduling on each of the at least one link is greater than the a first threshold, the first terminal device determines the transmission manner of the PDCP PDU as the data duplication transmission manner.

In at least one embodiment, the operation that the first terminal device determines the transmission manner of the PDCP PDU according to the number of times of retransmission scheduling on the at least one link within the first time period includes the following action. In condition that the number of times of retransmission scheduling on each of the at least one link is within a first range, the first terminal device determines the transmission manner of the PDCP PDU as the data duplication transmission manner.

The rules based on the first threshold and based on the first range may be adopted independently, and may also be adopted jointly, but a certain priority is provided. For example, the priority of the rule based on the first threshold may be higher than the rule based on the first range.

The first threshold and the first range may be determined by the influence of the number of times of retransmission scheduling on the channel quality of the link within a certain time.

In a possible implementation manner, the operation that the first terminal device determines the transmission manner of the PDCP PDU according to the number of times of continuous initial transmission scheduling on the at least one link within the second time period includes the following action. In condition that the number of times of continuous initial transmission scheduling on any of the at least one link is greater than or equal to a second threshold, the first terminal device determines the transmission manner of the PDCP PDU as the single-link transmission manner; or in condition that the number of times of continuous initial transmission scheduling on each of the at least one link is less than a second threshold, the first terminal device determines the transmission manner of the PDCP PDU as the data duplication transmission manner.

Likewise, the second threshold may be determined by the influence of the number of times of continuous initial transmission scheduling on the channel quality of the link within a certain time.

In a possible implementation manner, the operation that the first terminal device determines the transmission manner of the PDCP PDU according to the MCS value of the at least one link includes the following action. In condition that the MCS value of any of the at least one link is greater than or equal to a third threshold, the first terminal device determines the transmission manner of the PDCP PDU as the single-link transmission manner; or in condition that the MCS value of each of the at least one link is less than a third threshold, the first terminal device determines the transmission manner of the PDCP PDU as the data duplication transmission manner.

Likewise, the third threshold may be determined by the influence of the MCS value of the link on the channel quality of the link.

In addition, the terminal device may directly select the single-link transmission manner when determining that one channel has a good channel quality, and may also select the data duplication data transmission manner when determining that two or more links have poor channel qualities. The terminal device may further determine the transmission manner after determining the channel qualities of all links.

In a possible implementation manner, the method further includes the following operation. The first terminal device receives first indication information sent by the second terminal device or the network device. The first indication information is used for indicating the transmission manner of the PDCP PDU. The operation that the first terminal device determines the transmission manner of the PDCP PDU includes the following action. The first terminal device determines the transmission manner of the PDCP PDU according to the first indication information.

In at least one embodiment, in condition that the terminal device determines one transmission manner based on the above rules but receives the indication information at some time to directly indicate a transmission manner, and the directly indicated transmission manner is different from the transmission manner determined according to the rules, the terminal device may cover the transmission manner determined based on the rules with the directly indicated transmission manner.

In a possible implementation manner, the method further includes the following operation. Before the first terminal device sends the PDCP PDU, the first terminal device determines a link for transmission of the PDCP PDU.

In a possible implementation manner, the operation that the first terminal device determines the link for transmission of the PDCP PDU includes the following action. In condition that the transmission manner of the PDCP PDU is the single-link transmission manner, the first terminal device determines a link with optimal channel quality in multiple links as the link for transmission of the PDCP PDU; or in condition that the transmission manner of the PDCP PDU is the data duplication transmission manner, the first terminal device determines several links in the multiple links as links for transmission of duplication data of the PDCP PDU, according to a descending order of priorities of channel quality of the multiple links.

In condition that the single-link transmission manner is determined, the first terminal device may further arbitrarily select a link to transmit the PDCP PDU. In condition that the data duplication transmission manner is determined, the first terminal device may also arbitrarily select a plurality of links to transmit the PDCP PDU.

In a possible implementation manner, the method further includes the following operation. The first terminal device receives second indication information sent by the second terminal device or the network device. The second indication information is used for indicating a link for transmission of the PDCP PDU. The operation that the first terminal device determines the link for transmission of the PDCP PDU includes the following action. The first terminal device determines the link for transmission of the PDCP PDU according to the second indication information.

The network device may indicate the link for transmission of the PDCP PDU to the terminal device. The terminal device may adopt the link indicated by the network device, and may also select a link for transmission of the PDCP PDU according to its own condition.

When the terminal device selects a part of links to transmit the PDCP PDU, other links may be adopted to transmit other PDCP PDUs.

A second aspect provides a method for data transmission, which includes the following operation. A network device determines a transmission manner of a PDCP PDU of a first terminal device. The transmission manner includes a data duplication transmission manner or a single-link transmission manner. The network device sends first indication information to the first terminal device. The first indication information is used for indicating the transmission manner of the PDCP PDU.

In a possible implementation manner, the operation that the network device determines the transmission manner of the PDCP PDU includes the following action. The network device determines the transmission manner of the PDCP PDU according to channel quality information of at least one link.

In a possible implementation manner, the channel quality information of the at least one link includes a number of times of retransmission scheduling on the at least one link within a first time period, a number of times of continuous initial transmission scheduling on the at least one link within a second time period or an MCS value of the at least one link. The operation that the network device determines the transmission manner of the PDCP PDU according to the channel quality information of the at least one link includes the following action. The network device determines the transmission manner of the PDCP PDU according to the number of times of retransmission scheduling on the at least one link within the first time period, the number of times of continuous initial transmission scheduling on the at least one link within the second time period or the MCS value of the at least one link.

In a possible implementation manner, the operation that the network device determines the transmission manner of the PDCP PDU according to the number of times of retransmission scheduling on the at least one link within the first time period includes the following action. In condition that the number of times of retransmission scheduling on any of the at least one link is less than or equal to a first threshold, the network device determines the transmission manner of the PDCP PDU as the single-link transmission manner; or in condition that the number of times of retransmission scheduling on each of the at least one link is greater than a first threshold, the second terminal device or the network device determines the transmission manner of the PDCP PDU as the data duplication transmission manner.

In a possible implementation manner, the operation that the network device determines the transmission manner of the PDCP PDU according to the number of times of continuous initial transmission scheduling on the at least one link within the second time period includes the following action. In condition that the number of times of continuous initial transmission scheduling on any of the at least one link is greater than or equal to a second threshold, the network device determines the transmission manner of the PDCP PDU as the single-link transmission manner; or in condition that the number of times of continuous initial transmission scheduling on each of the at least one link is less than the second threshold, the network device determines the transmission manner of the PDCP PDU as the data duplication transmission manner.

In a possible implementation manner, the operation that the network device determines the transmission manner of the PDCP PDU according to the MCS value of the at least one link includes the following action. In condition that the MCS value of any of the at least one link is greater than or equal to a third threshold, the network device determines the transmission manner of the PDCP PDU as the single-link transmission manner; or in condition that the MCS value of each of the at least one link is less than a third threshold, the network device determines the transmission manner of the PDCP PDU as the data duplication transmission manner.

In a possible implementation manner, in condition of multiple links, the method further includes the following operations. In condition that the transmission manner of the PDCP PDU is the single-link transmission manner, the network device determines a link with optimal channel quality in the multiple links as the link for transmission of the PDCP PDU; or in condition that the transmission manner of the PDCP PDU is the data duplication transmission manner, the network device determines several links in the multiple links as links for transmission of the PDCP PDU. The network device sends second indication information to the first terminal device, and the second indication information is used for indicating the link for transmission of the PDCP PDU.

A third aspect provides a terminal device, which is configured to execute the method in the first aspect or any possible implementation mode of the first aspect. The terminal device includes units configured to execute the method in the first aspect or any possible implementation mode of the first aspect.

A fourth aspect provides a network device, which is configured to execute the method in the second aspect or any possible implementation mode of the first aspect. The network device includes units configured to execute the method in the second aspect or any possible implementation mode of the second aspect.

A fifth aspect provides a terminal device, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementation mode of the first aspect.

A sixth aspect provides a network device, which includes a memory, a processor, an input interface and an output interface. The memory, the processor, the input interface and the output interface are connected through a bus system. The memory is configured to store an instruction. The processor is configured to execute the instruction stored in the memory to execute the method in the second aspect or any possible implementation mode of the second aspect.

A seventh aspect provides a computer storage medium, which is configured to store a computer software instruction to execute the method in the first aspect or any possible implementation mode of the first aspect, or execute the method in the second aspect or any possible implementation mode of the second aspect, and includes a program configured to execute the above aspects.

These aspects or other aspects of the disclosure will become apparent through the following descriptions about the embodiments.

DETAILED DESCRIPTION

Figure 1:
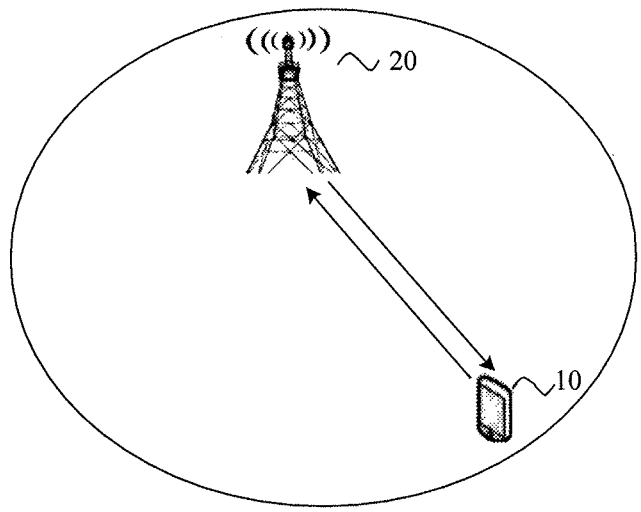
FIG. 1 illustrates a schematic diagram of an application scenario according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

The technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may represent User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, UE in a future 5G network, UE in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Alternatively, the network device may be a relay station, an access point, a vehicle-mounted device, a wearable device, a network device in the future 5G network, a network device in the future evolved PLMN or the like. There are no limits made in the embodiments of the disclosure.

FIG. 1 illustrates a schematic diagram of an application scenario according to an embodiment of the disclosure. A communication system in FIG. 1 may include a terminal device 10 and a network device 20. The network device 20 is configured to provide a communication service for the terminal device 10 for access to a core network. The terminal device 10 searches a synchronous signal, broadcast signal and the like sent by the network device 20 to access the network, thereby communicating with the network. Arrows illustrated in FIG. 1 may represent uplink/downlink transmission implemented through a cellular link between the terminal device 10 and the network device 20.

In a carrier aggregation scenario, the PDCP may support a data duplication function. That is, the data duplication function of the PDCP enables the duplication data to correspond to two or more logical channels, and finally ensures that the duplicated multiple same PDCP PDUs can be transmitted on different physical layer aggregation carriers to achieve a frequency diversity gain, thus improving the data transmission reliability.

Figure 2:
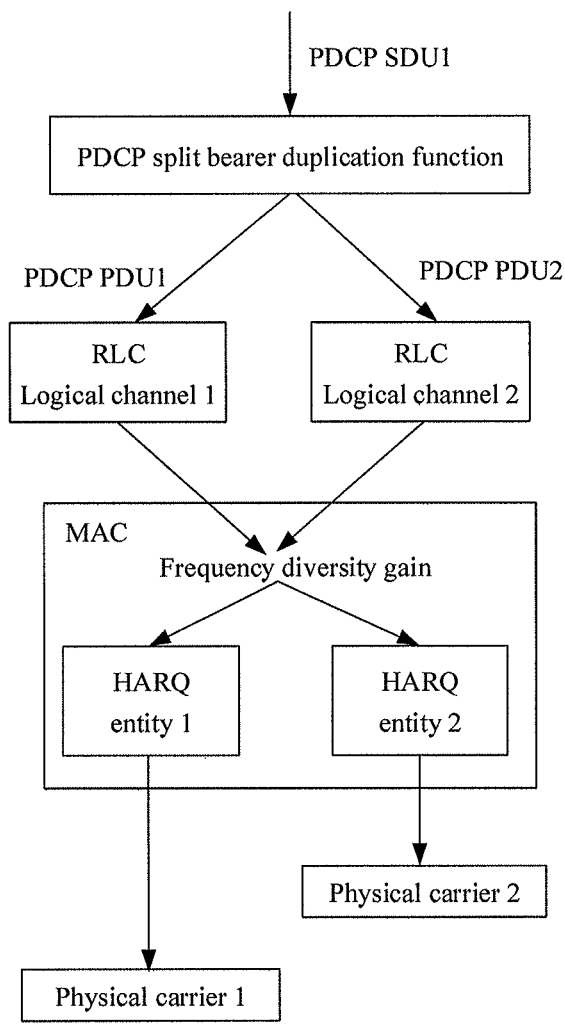
FIG. 2 illustrates an architecture diagram of a protocol for data duplication transmission in a carrier aggregation scenario.

In order to facilitate understanding, scheduling of the duplication data to different physical carriers will be described below simply in combination with FIG. 2. FIG. 2 illustrates an architecture diagram of a protocol for data duplication transmission in a carrier aggregation scenario. As illustrated in FIG. 2, PDCP layer has a split bearer duplication function. A data process of the PDCP service data unit 1 (SDU1) is duplicated and encapsulated into PDCP PDU1 and PDCP PDU2. The PDCP PDU1 and the PDCP PDU2 have the same content, i.e., both of them bear the same data payload and header. The PDCP PDU1 and the PDCP PDU2 are respectively mapped to different Radio Link Control (RLC) entities, and the RLC entities place the PDCP PDU1 and the PDCP PDU2 into different logical channels (logical channel 1 and logical channel 2). For Media Access Control (MAC), upon knowing which logical channel transmits the duplication data of a same PDCP PDU, these duplication data are transmitted on different carriers via different Hybrid Automatic Repeat Request (HARQ) entities. For example, the duplication data carried in the logical channel 1 are transmitted on the physical carrier 1 via the HARQ entity 1, and the duplication data carried in the logical channel 2 are transmitted on the physical carrier 2 via the HARQ entity 2.

Although the duplication data transmission of the PDCP layer can effectively improve the reliability of data transmission by using the diversity gain, the obvious defect is that the method has the extremely low system resource utilization rate, i.e., different resources are required to transmit the same content.

Figure 3:
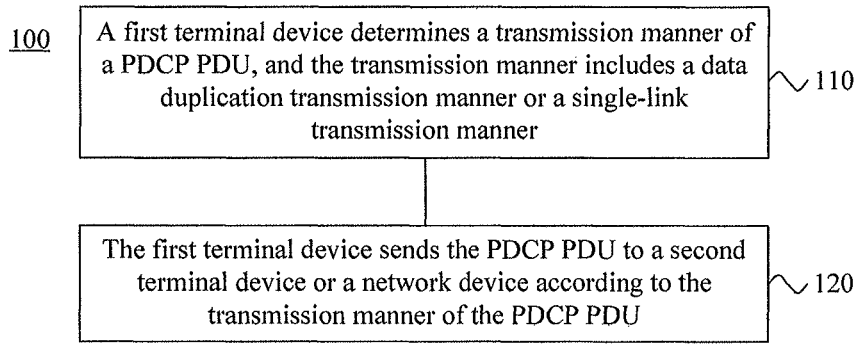
FIG. 3 illustrates a schematic block diagram of a method for data transmission according to an embodiment of the disclosure.

FIG. 3 illustrates a schematic block diagram of a method 100 for data transmission according to an embodiment of the disclosure. As illustrated in FIG. 3, the method 100 may include the following operations.

At S110, a first terminal device determines a transmission manner of a PDCP PDU, and the transmission manner includes a data duplication transmission manner or a single-link transmission manner.

At S120, the first terminal device sends the PDCP PDU to a second terminal device or a network device according to the transmission manner of the PDCP PDU.

It is to be noted that the embodiment of the disclosure may be applied to a communication scenario from a terminal device to a network device, and may also be applied to a communication scenario from a terminal device to another terminal device.

The terminal device may flexibly determine the transmission manner of the PDCP PDU, i.e., determining whether the data duplication function is used in the PDCP. The data duplication transmission manner may be a manner that a PDCP layer of the terminal device duplicates a PDCP PDU into multiple copies and instructs to an MAC layer, and the MAC layer respectively schedules the duplication data of the PDCP PDU to multiple links (i.e., physical layer carriers in FIG. 2) for transmission. The single-link transmission manner may be a manner that a PDCP layer of the terminal device does not duplicate a PDCP PDU and instructs to an MAC layer, and the MAC layer schedules the PDCP PDU to one or more links for transmission. After determining the transmission manner, the terminal device may transmit the PDCP PDU by adopting the determined transmission manner. For example, in condition that the terminal device determines that the transmission manner is the single-link transmission manner, the terminal device may transmit the PDCP PDU by adopting one link; and in condition that the terminal device determines that the transmission manner is the data duplication transmission manner, the terminal device may select multiple links to transmit the duplication data of the PDCP PDU.

It should be understood that the PDCP PDU may be a service having a requirement on high reliability of data transmission. That is, when the PDCP PDU of the service needs to be transmitted, it is necessary to determine whether the PDCP PDU is required to be duplicated. For other PDCP PDUs without the high demand on the data transmission, this transmission manner may not be determined, and the single-link transmission manner is adopted directly for transmission.

Therefore, the method for the data transmission in this embodiment of the disclosure is beneficial to balancing a relationship between the resource utilization and the data transmission reliability.

In at least one embodiment of the disclosure, the operation that the first terminal device determines the transmission manner of the PDCP PDU includes the following action. The first terminal device determines the transmission manner of the PDCP PDU according to channel quality information of at least one link.

The at least one link may be all links for the terminal device, and may also be a part of links for the terminal device. For example, in condition that a terminal device includes five links, the terminal device may determine the transmission manner of the PDCP PDU according to respective channel quality information of the five links. The terminal device may also determine the transmission manner of the PDCP PDU according to respective channel quality information of a part of the five links.

The channel quality information of the at least one link may be notified to the terminal device by the network device. For example, after knowing uplink channel estimation on each link, the network device may feed it to the terminal device; or after knowing uplink resource usage on each link, the network device may also feed it back to the terminal device. The channel quality information of the link may include the following information: a channel quality indicator (CQI), the number of times of retransmission scheduling within a certain time period, the number of times of continuous initial transmission scheduling within a certain time period or a Modulation and Coding Scheme (MCS), etc., which is not limited to the above information in this embodiment of the disclosure.

In at least one embodiment of the disclosure, the operation that the first terminal device determines the transmission manner of the PDCP PDU according to the number of times of retransmission scheduling on the at least one link within the first time period includes the following action. In condition that the number of times of retransmission scheduling on any of the at least one link is less than or equal to a first threshold, the first terminal device determines the transmission manner of the PDCP PDU as the single-link transmission manner. In condition that the number of times of retransmission scheduling on each of the at least one link is greater than the first threshold, the first terminal device determines the transmission manner of the PDCP PDU as the data duplication transmission manner.

In at least one embodiment, the operation that the first terminal device determines the transmission manner of the PDCP PDU according to the number of times of retransmission scheduling on the at least one link within the first time period includes the following action. In condition that the number of times of retransmission scheduling on each of the at least one link is within a first range, the first terminal device determines the transmission manner of the PDCP PDU as the data duplication transmission manner.

A rule may be configured via Radio Resource Control (RRC). The rule may be that different relationships between the number of times of retransmission scheduling on respective links and a threshold correspond to different transmission manners. The statistics may be made on the number of times of retransmission scheduling on different links, and the number of times of retransmission scheduling is associated with the channel quality. For example, in condition that it is found that when the number of times of retransmission scheduling within a certain time period is less than 5 times, the channel quality is obviously good, then the threshold for the rule may be set as 5. The terminal device may periodically count the number of times of retransmission scheduling. For example, the terminal device may count the number of times of retransmission scheduling every 100 ms, and the terminal device may determine whether the number of times of retransmission scheduling in the previous 100 ms is within the threshold when a PDCP PDU is to be transmitted. In condition that the number of times of retransmission scheduling is within the threshold, it may be at least proved that the channel quality on the link is good and the data transmission reliability is high, and the terminal device may select the single-link transmission manner. The terminal device may determine to adopt the data duplication transmission manner according to the condition that the number of times of retransmission scheduling on one link is greater than the threshold, and the terminal device may also determine to adopt the data duplication transmission manner according to the condition that the numbers of times of retransmission scheduling on a plurality of links are greater than the threshold. The relationships between the threshold and the numbers of times of retransmission scheduling on several links, the number of which may be determined based on the terminal device, may be determined by the terminal device. There are no limits made in the embodiments of the disclosure.

The terminal device may further be based on another rule. That is, the terminal device may determine that the number of times of retransmission scheduling on the at least one link is within a range and then determines the transmission manner of PDCP PDU to be transmitted as the data duplication transmission manner. For example, in condition that the range is within 5-10 times, the terminal device may judge whether the numbers of times of retransmission scheduling on a plurality of links are within 5-10 times. In condition that the terminal device judges that the numbers of times of retransmission scheduling on the plurality of links are within 5-10 times, it may be determined that the transmission manner is the data duplication transmission manner.

It should be understood that the solutions based on the first range and the first threshold may be configured for the terminal device jointly. In other words, two rules for determining the transmission manners are provided but there is a priority for the two schemes. For example, in condition that the priority of the rule based on the first threshold is higher than the rule based on the first range, when the terminal device has a PDCP PDU to be transmitted, the terminal device may first determines whether the number of times of retransmission scheduling on one of the links is greater than the first threshold. In condition that the number of times of retransmission scheduling on the link is less than the first threshold, the terminal device directly determines that the transmission manner of the PDCP PDU is the single-link transmission manner. In condition that the terminal device determines that the numbers of times of retransmission scheduling on two links are greater than the first threshold, the terminal device may directly determines that the transmission manner of the PDCP PDU is the data duplication transmission manner; or the terminal device determines whether the numbers of times of retransmission scheduling on the two links are within the first range, in condition that the numbers of times of retransmission scheduling on the two links are within the first range, the terminal device may determine that the transmission manner of the PDCP PDU is the data duplication transmission manner.

It should be further understood that the number of times of retransmission scheduling may be the number of times of retransmission scheduling within a previous time period, and may also be an average value of the numbers of times of retransmission scheduling within several previous time periods. The manner for obtaining the number of times of retransmission scheduling is not limited by this embodiment of the disclosure.

The above is merely an example of the rule for configuring the number of times of retransmission scheduling on each link, which does not form any limit to this embodiment of the disclosure.

In at least one embodiment of the disclosure, the operation that the first terminal device determines the transmission manner of the PDCP PDU according to the number of times of continuous initial transmission scheduling on each link within the second time period includes the following action. In condition that the number of times of continuous initial transmission scheduling on any of the at least one link is greater than or equal to a second threshold, the first terminal device determines the transmission manner of the PDCP PDU as the single-link transmission manner. In condition that the number of times of continuous initial transmission scheduling on each of the at least one link is less than the second threshold, the first terminal device determines the transmission manner of the PDCP PDU as the data duplication transmission manner.

A rule may be configured via RRC. The rule may be that different relationships between the number of times of continuous initial transmission scheduling on respective links and a threshold correspond to, different transmission manners. The statistics may be made on the number of times of continuous initial transmission scheduling on different links, and the number of times of continuous initial transmission scheduling is associated with the channel quality. For example, in condition that it is found that when the number of times of continuous initial transmission scheduling within a certain time period is less than 5 times, the channel quality is obviously good, then the threshold for the rule may be set as 5. The terminal device may periodically count the number of times of continuous initial transmission scheduling. For example, the terminal device may count the number of times of retransmission scheduling every 100 ms, and the terminal device may determine whether the number of times of continuous initial transmission scheduling in the previous 100 ms is out of the threshold when a PDCP PDU is to be transmitted. In condition that the number of times of continuous initial transmission scheduling is out of the threshold, it may be at least proved that the channel quality on the link is good and the data transmission reliability is high, and the terminal device may select the single-link transmission manner. The terminal device may determine to adopt the data duplication transmission manner according to the condition that the number of times of continuous initial transmission scheduling on one link is less than the threshold, and the terminal device may also determine to adopt the data duplication transmission manner according to the condition that the numbers of times of continuous initial transmission scheduling on a plurality of links are less than the threshold. The relationships between the threshold and the numbers of times of continuous initial transmission scheduling on several links, the number of which may be determined based on the terminal device, may be determined by the terminal device. There are no limits made in the embodiments of the disclosure.

It should be further understood that the number of times of continuous initial transmission scheduling may be the number of times of continuous initial transmission scheduling within a previous time period, and may also be an average value of the numbers of times of continuous initial transmission scheduling within several previous time periods. The manner for obtaining the number of times of continuous initial transmission scheduling is not limited by this embodiment of the disclosure.

It should be further understood that the rule based on the number of times of continuous initial transmission scheduling is similar to the rule based on the number of retransmission times, which will not be elaborated herein for the briefness.

In at least one embodiment of the disclosure, the operation that the first terminal device determines the transmission manner of the PDCP PDU according to the MCS value of each link includes the following action. In condition that the MCS value of the at least one link is greater than or equal to a third threshold, the first terminal device determines the transmission manner of the PDCP PDU as the single-link transmission manner. In condition that the MCS value of each of the at least one link is less than the third threshold, the first terminal device determines the transmission manner of the PDCP PDU as the data duplication transmission manner.

A rule may be configured via RRC. The rule may be that different relationships between the MCS values of respective links and a threshold correspond to different transmission manners. The MCS values on different links may be associated with the channel quality. For example, in condition that it is found that when an MCS is greater than a threshold, the channel quality is obviously good, then the threshold for the rule may be set as the MCS value. The terminal device may determine whether an MCS value in downlink control, information sent by the network device is greater than the threshold in the rule when a PDCP PDU is to be transmitted. In condition that the MCS value is greater than the threshold, it may be at least proved that the channel quality on the link is good and the data transmission reliability is high, and the terminal device may select the single-link transmission manner. The terminal device may determine to adopt the data duplication transmission manner according to the condition that the MCS value of one link is less than the threshold, and the terminal device may also determine to adopt the data duplication transmission manner according to the condition that the MCS values of a plurality of links are less than the threshold. The relationships between the threshold and the MCS values on several links, the number of which may be determined based on the terminal device, may be determined by the terminal device. There are no limits made in the embodiments of the disclosure.

It should be further understood that the rule based on the MCS value is similar to the rule based on the number of retransmission times, which will not be elaborated herein for the briefness.

It should be further understood that the above are to determine the transmission manner of the PDCP PDU according to the number of times of retransmission scheduling, the number of times of continuous initial transmission scheduling and the MCS value. The above rules may be implemented independently, and may also be implemented in combination. Information relevant to the channel quality all are within the protection scope of the embodiments of the disclosure.

In at least one embodiment of the disclosure, the method further includes the following operation. The first terminal device receives first indication information sent by the second terminal device or the network device, The first indication information is used for indicating the transmission manner of the PDCP PDU. The operation that the first terminal device determines the transmission manner of the PDCP PDU includes: the first terminal device determines the transmission manner of the PDCP PDU according to the first indication information.

The network device may also determine the transmission manner of the PDCP PDU according to the above rules, and the determined transmission manner is directly instructed to the terminal device. For example, the network device and the terminal device may agree to indicate the transmission manner by using 1 bit in the downlink control information, and agrees that in condition that the 1-bit value is 0, it is indicated that the transmission manner is the single-link transmission manner, and in condition that the 1-bit value is 1, it is indicated that the transmission manner is the data duplication transmission manner. Those skilled in the art may understand that the above are merely schematic descriptions, which does not form any limit to the embodiments of the disclosure.

In at least one embodiment, when the terminal device determines one transmission manner based on the above rules but receives the indication information at some time to directly indicate a transmission manner, and the directly indicated transmission manner is different from the transmission manner determined via the rules, the terminal device may cover the transmission manner determined based on the rules with the directly indicated transmission manner.

In at least one embodiment of the disclosure, the method further includes the following operation. The first terminal device determines a link for transmitting the PDCP PDU.

Before the PDCP PDU is transmitted, an MAC layer of the terminal device may select a transmission link first, i.e., the MAC layer of the terminal device select a physical layer carrier on which the PDCP PDU is scheduled. For example, in condition that the terminal device determines that the transmission manner is the single-link transmission manner, the terminal device may select any one link for transmission, and may also directly use a link with the number of times of retransmission scheduling less than the threshold to transmit the PDCP PDU. The terminal device may also determine the number of times of retransmission scheduling on each link respectively, and transmits the PDCP PDU by using a link with the smallest number of times of retransmission scheduling in all links. In condition that the terminal device determines that the transmission manner is the data duplication transmission manner, the terminal device may select any two or more links to transmit the duplication data of the PDCP PDU. The terminal device may further determines the number of times of continuous initial transmission scheduling on each link respectively, and may transmit the PDCP PDU by using first several links in all links ranked in descending order of the number of times of continuous initial transmission. The terminal device may select the link for transmission the PDCP. PDU by determining the MCS value. The method for determining the transmission manner for transmission of the PDCP PDU by the terminal device is not limited in the disclosure.

In at least one embodiment of the disclosure, the method further includes the following operations. The first terminal device receives second indication information sent by the second terminal device or the network device, and the second indication information is used for indicating a link for transmission of the PDCP PDU. The first terminal device determines the link for transmission of the PDCP PDU according to the second indication information.

In other words, the link for transmission of the PDCP PDU may be directly indicated by the network device. In such a case, the terminal device may not determine the transmission manner of the PDCP PDU and perform transmission of the PDCP PDU directly via the link indicated by the network device. In other words, the indication information indicates a link, and the terminal device directly performs transmission of the PDCP PDU via the link indicated by the indication information; the indication information indicates a plurality of links, and the terminal device may directly performs transmission of the PDCP PDU via the plurality of links indicated by the indication information. The terminal device may also determine the transmission manner of the PDCP PDU according to the determination regarding whether the link indicated by the network device is a single link. For example, in condition that the indication information indicates one link, it may be indicated that the transmission manner of the PDCP PDU is the single-link transmission manner, and the terminal device may perform transmission of the PDCP PDU via the link indicated by the network device and may also transmit the PDCP PDU by adopting the other link. In condition that the indication information indicates two or more links, it may be indicated that the transmission manner of the PDCP PDU is the data duplication transmission manner, and the terminal device may transmit the duplication data of the PDCP PDU by adopting the links indicated by the network device, may also transmit the duplication data of the PDCP PDU by adopting part of the links indicated by the network device, and may further transmit the duplication data of the PDCP PDU by adopting other links. In conclusion, the network device may indicate the link(s) for transmitting the PDCP PDU to the terminal device. The terminal device may adopt the link indicated by the network device for transmission of the PDCP PDU, and may also select a link for transmission of the PDCP PDU according to its own condition.

Further, the indication information may indicate the switching from the data duplication transmission manner to a PDCP layer data duplication transmission manner. The switching may be that the physical layer carriers, to which the duplication data of the PDCP PDU is mapped, are updated, i.e., the links for transmission of the duplication data change. The indication information may further indicate the switching from the data duplication transmission manner to the single-link transmission manner, and indicates the link on which the PDCP PDU is transmitted. The indication information may further indicate the switching from the single-link transmission manner to the data duplication transmission manner, and indicates the link on which the duplication data of the PDCP PDU are transmitted. The indication information may further indicate that a transmission link is updated from the single-link transmission manner to the single-link transmission manner.

When the terminal device selects a part of links to transmit the PDCP PDU, other links may be adopted to transmit other PDCP PDUs, such as some PDCP PDUs without the high demand on the data transmission reliability.

Therefore, the method for the data transmission in the embodiments of the disclosure may dynamically switch the transmission manners of the PDCP PDU, such that the resource utilization and the data transmission reliability can be balanced well.

Figure 4:
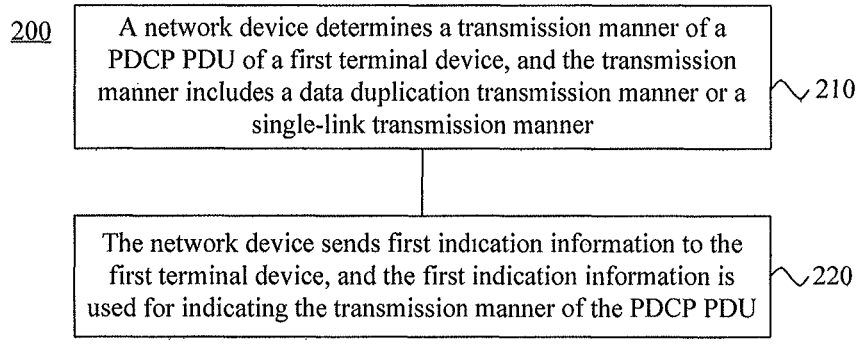
FIG. 4 illustrates another schematic block diagram of a method for data transmission according to an embodiment of the disclosure.

FIG. 4 illustrates a schematic block diagram of a method 200 for data transmission according to an embodiment of the disclosure. As illustrated in FIG. 4, the method 200 may include the following operations.

At S210, a network device determines a transmission manner of a PDCP PDU of a first terminal device, and the transmission manner includes a data duplication transmission manner or a single-link transmission manner.

At S220, the network device sends first indication information to the first terminal device, and the first indication information is used for indicating the transmission manner of the PDCP PDU.

Therefore, the method for the data transmission in this embodiment of the disclosure can balance the resource utilization and the data transmission reliability well.

It should be understood that the network device may also not notify, upon the determination of the transmission manner of the PDCP PDU, the terminal device of the transmission manner of the PDCP PDU. Likewise, the terminal device may determine the transmission manner of the PDCP PDU via a configured rule.

In at least one embodiment of the disclosure, the operation that the network device determines the transmission manner of the PDCP PDU of the first terminal device includes the following action. The network device determines the transmission manner of the PDCP PDU according to channel quality information of at least one link.

In at least one embodiment of the disclosure, the channel quality information of the at least one link includes the number of times of retransmission scheduling on the at least one link within a first time period, the number of times of continuous initial transmission scheduling on the at least one link within a second time period or an MCS value of each link. The operation that the network device determines the transmission manner of the PDCP PDU according to channel quality information of the at least one link includes the following action. The network device determines the transmission manner of the PDCP PDU according to the number of times of retransmission scheduling on the at least one link within the first time period, the number of times of continuous initial transmission scheduling on each link within the second time period or an MCS value of each link.

In at least one embodiment of the disclosure, the operation that the network device determines the transmission manner of the PDCP PDU according to the number of times of retransmission scheduling on the at least one link within the first time period includes the following action. In condition that the number of times of retransmission scheduling on any of the at least one link is less than or equal to a first threshold, the network device determines the transmission manner of the PDCP PDU as the single-link transmission manner. In condition that the number of times of retransmission scheduling on each of the at least one link is greater than the first, threshold, the network device determines the transmission manner of the PDCP PDU as the data duplication transmission manner.

In at least one embodiment of the disclosure, the operation that the network device determines the transmission manner of the PDCP PDU according to the number of times of continuous initial transmission scheduling on the at least one link within the second time period includes the following action. In condition that the number of times of continuous initial transmission scheduling on any of the at least one link is greater than or equal to a second threshold, the network device determines the transmission manner of the PDCP PDU as the single-link transmission manner. In condition that the number of times of continuous initial transmission scheduling on each of the at least one link is less than the second threshold, the network device determines the transmission manner of the PDCP PDU as the data duplication transmission manner.

In at least one embodiment of the disclosure, the operation that the network device determines the transmission manner of the PDCP PDU according to the MCS value of the at least one link includes the following action. In condition that the MCS value of any of the at least one link is greater than or equal to a third threshold, the network device determines the transmission manner of the PDCP PDU as the single-link transmission manner. In condition that the MCS value of each of the at least one link is less than the third threshold, the network device determines the transmission manner of the PDCP PDU as the data duplication transmission manner.

In at least one embodiment of the disclosure, the at least one link is multiple links, and the method further includes the following operations. In condition that the transmission manner of the PDCP PDU is the single-link transmission manner, the network device determines a link with the optimal channel quality in the multiple links as the link for transmission of the PDCP PDU. In condition that the transmission manner of the PDCP PDU is the data duplication transmission manner, the network device determines, according to a descending order of priorities of channel quality of the multiple links, several links in the multiple links as links for transmission of the PDCP PDU. The network device sends second indication information to the first terminal device. The second indication information is used for indicating the link for transmission of the PDCP PDU.

It should be understood that interaction between the network device and the terminal device and related properties, functions and the like described from the network device correspond to related properties, functions and the like of the terminal device. In other words, any information sent to the network device by the terminal device will be received by the network device correspondingly. The related contents have been described, for simplicity, will not be elaborated herein.

It should be further understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Figure 5:
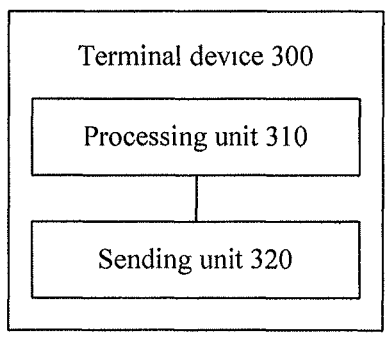
FIG. 5 illustrates a schematic block diagram of a terminal device for data transmission according to an embodiment of the disclosure.

FIG. 5 illustrates a schematic block diagram of a terminal device 300 for data transmission according to an embodiment of the disclosure. As illustrated in FIG. 5, the terminal device 300 may include a processing unit 310 and a sending unit 320.

The processing unit 310 is configured to determine a transmission manner of a PDCP PDU. The transmission manner includes a data duplication transmission manner or a single-link transmission manner.

The sending unit 320 is configured to send the PDCP PDU to a second terminal device or a network device according to the transmission manner of the PDCP PDU.

Therefore, the method for the data transmission in this embodiment of the disclosure may dynamically switch the transmission manners of the PDCP PDU, such that the resource utilization rate and the data transmission reliability can be balanced well.

In at least one embodiment of the disclosure, the processing unit 310 may be configured to determine the transmission manner of the PDCP PDU according to channel quality information of at least one link.

In at least one embodiment of the disclosure, the channel quality information of the at least one link may include the number of times of retransmission scheduling on the at least one link within a first time period, the number of times of continuous initial transmission scheduling on the at least one link within a second time period or an MCS value of the at least one link. The processing unit 310 may be configured to determine the transmission manner of the PDCP PDU according to the number of times of retransmission scheduling on the at least one link within the first time period, the number of times of continuous initial transmission scheduling on the at least one link within the second time period or an MCS value of the at least one link.

In at least one embodiment of the disclosure, the processing unit 310 may be configured to determine, in condition that the number of times of retransmission scheduling on any of the at least one link is less than or equal to a first threshold, the transmission manner of the PDCP PDU as the single-link transmission manner; or determine, in condition that the number of times of retransmission scheduling on each of the at least one link is greater than the first threshold, the transmission manner of the PDCP PDU as the data duplication transmission manner.

In at least one embodiment of the disclosure, the processing unit 310 may be configured to determine, in condition that the number of times of continuous initial transmission scheduling on any of the at least one link is greater than or equal to a second threshold, the transmission manner of the PDCP PDU as the single-link transmission manner; or determine, in condition that the number of times of continuous initial transmission scheduling on each of the at least one link is less than the second threshold, the transmission manner of the PDCP PDU as the data duplication transmission manner.

In at least one embodiment of the disclosure, the processing unit 310 may be configured to determine, in condition that the MCS value of the at least one link is greater than or equal to a third threshold, the transmission manner of the PDCP PDU as the single-link transmission manner; or determine, in condition that the MCS value of each of the at least one link is less than the third threshold, the transmission manner of the PDCP PDU as the data duplication transmission manner.

In at least one embodiment of the disclosure, the terminal device 300 may further include a receiving unit 330. The receiving unit is configured to receive first indication information sent by the second terminal device or the network device. The first indication information is used for indicating the transmission manner of the PDCP PDU. The processing unit 310 is configured to determine the transmission manner of the PDCP PDU according to the first indication information.

In at least one embodiment of the disclosure, the at least one link may be multiple links. The processing unit 310 may further be configured to determine, in condition that the transmission manner of the PDCP PDU is the single-link transmission manner, a link with the optimal channel quality in the multiple links as the link for transmission of the PDCP PDU; or determine, in condition that the transmission manner of the PDCP PDU is the data duplication transmission manner, several links in the multiple links as links for transmission of duplication data of the PDCP PDU according to a descending order of priorities of channel quality of the multiple links.

In at least one embodiment of the disclosure, the receiving unit 330 may further be configured to receive second indication information sent by the second terminal device or the network device. The second indication information is used for indicating a link for transmission of the PDCP PDU. The processing unit is configured to determine the link for transmission of the PDCP PDU according to the second indication information.

It should be understood that the terminal device 300 for the data transmission according to the embodiment of the disclosure may correspond to the terminal device in the method embodiments of the disclosure and the abovementioned and other operations and/or functions of each unit in the terminal device 300 are adopted to implement the corresponding processes executed by the terminal device in the method in FIG. 3 respectively, which will not be elaborated herein for simplicity.

Figure 6:
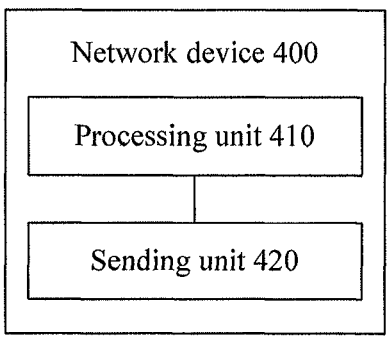
FIG. 6 illustrates a schematic block diagram of a network device for data transmission according to an embodiment of the disclosure.

FIG. 6 illustrates a schematic block diagram of a network device 400 for data transmission according to an embodiment of the disclosure. As illustrated in FIG. 6, the network device 400 may include a processing unit 410 and a sending unit 420.

The processing unit 410 is configured to determine a transmission manner of a PDCP PDU of a first terminal device. The transmission manner includes a data duplication transmission manner or a single-link transmission manner.

The sending unit 42Q is configured to send first indication information to the first terminal device. The first indication information is used for indicating the transmission manner of the PDCP PDU.

Therefore, the method for the data transmission in this embodiment of the disclosure may dynamically switch the transmission manner of the PDCP PDU, such that the resource utilization rate and the data transmission reliability can be balanced well.

In at least one embodiment of the disclosure, the processing unit 410 may be configured to determine the transmission manner of the PDCP PDU according to channel quality information of at least one link.

In at least one embodiment, of the disclosure, the channel quality information of the at least one link may include the number of times of retransmission scheduling on the at least one link within a first time period, the number of times of continuous initial transmission scheduling on the at least one link within a second time period or an MCS value of each link. The processing unit 410 may be configured to determine the transmission manner of the PDCP PDU according to the number of times of retransmission scheduling on the at least one link within the first time period, the number of times of continuous initial transmission scheduling on each link within the second time period or an MCS value of each link.

In at least one embodiment of the disclosure, the processing unit 410 may be configured to determine, in condition that the number of times of retransmission scheduling on any of the at least one link is less than or equal to a first threshold, the transmission manner of the PDCP PDU as the single-link transmission manner; or determine, in condition that the number of times of retransmission scheduling on each of the at least one link is greater than the first threshold, the transmission manner of the PDCP PDU as the data duplication transmission manner.

In at least one embodiment of the disclosure, the processing unit 410 may be configured to determine, in condition that the number of times of continuous initial transmission scheduling on any of the at least one link is greater than or equal to a second threshold, the transmission manner of the PDCP PDU as the single-link transmission manner; or determine, in condition that the number of times of continuous initial transmission scheduling on each of the at least one link is less than the second threshold, the transmission manner of the PDCP PDU as the data duplication transmission manner.

In at least one embodiment of the disclosure, the processing unit 410 may be configured to determine, in condition that the MCS value of any of the at least one link is greater than or equal to a third threshold, the transmission manner of the PDCP PDU as the single-link transmission manner; or determine, in condition that the MCS value of each of the at least one link is less than the third threshold, the transmission manner of the PDCP PDU as the data duplication transmission manner.

In at least one embodiment of the disclosure, the at least one link may be multiple links. The processing unit 410 may further be configured to determine, in condition that the transmission manner of the PDCP PDU is the single-link transmission manner, a link with the optimal channel quality in the multiple links as the link for transmission of the PDCP PDU; or determine, in condition that the transmission manner of the PDCP PDU is the data duplication transmission manner, several links in the multiple links as links for transmission of the PDCP PDU according to a descending order of priorities of channel quality of the multiple links. The sending unit 420 may further be configured to send second indication information to the first terminal device. The second indication information is used for indicating the link for transmission of the PDCP PDU.

It is to be understood that the network device 400 for the data transmission according to the embodiment of the disclosure may correspond to the network device in the method embodiment of the disclosure and the abovementioned and other operations and/or functions of each unit in the network device 400 are adopted to implement the corresponding processes executed by the network device in the method in FIG. 4 respectively, which will not be elaborated herein for simplicity.

Figure 7:
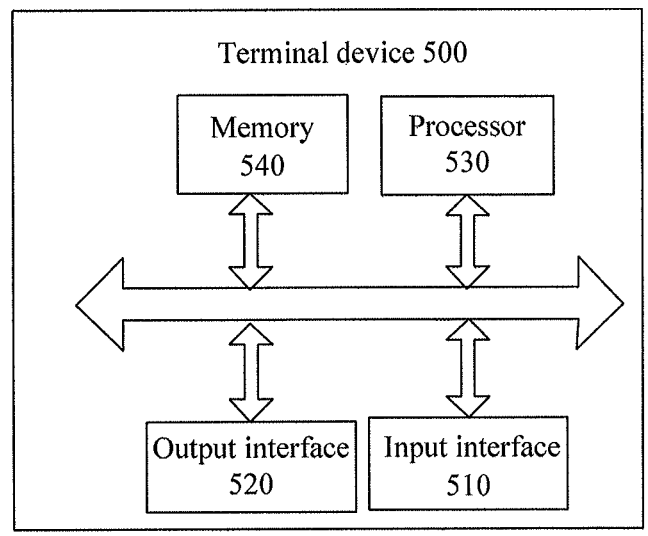
FIG. 7 illustrates another schematic block diagram of a terminal device for data transmission according to an embodiment of the disclosure.

As illustrated in FIG. 7, an embodiment of the disclosure further provides a terminal device 500 for data transmission. The terminal device 500 may be the terminal device 300 in FIG. 5, and may be configured to execute operations of the terminal device corresponding to the method 100 in FIG. 3. The terminal device 500 includes an input interface 510, an output interface 520, a processor 530 and a memory 540. The input interface 510, the output interface 520, the processor 530 and the memory 540 may be connected through a bus system. The memory 540 is configured to store a program, an instruction or a code. The processor 530 is configured to execute the program, instruction or code in the memory 540 to control the input interface 510 to receive a signal, control the output interface 520 to send a signal and complete operations in the above method embodiments.

Therefore, the terminal device for data transmission provided by this embodiment of the disclosure may dynamically switch the transmission manners of the PDCP PDU, such that the resource utilization rate and the data transmission reliability can be balanced well.

In this embodiment of the disclosure, the processor 530 may be a Central Processing Unit (CPU). The processor 530 may further be other universal processors, a Digital Signal Processor (DSP), an Application Specific Integrated Circuit (ASIC) and a Field Programmable Gate. Array (FPGA) or other programmable logic devices, discrete gates or transistor logic devices, and discrete hardware component, etc. The universal processor may be a microprocessor or the processor may also be any conventional processor, etc.

The memory 540 may include a Read Only Memory (ROM) and a Random Access Memory (RAM) and provides instructions and data for the processor 530. A part of the memory 540 may further include a nonvolatile RAM. For example, the memory 540 may further store information on a device type.

During an implementation process, the operations of the above methods may be accomplished by an integrated logic circuit of hardware in the processor 530 or an instruction in a software form. The operations of the methods disclosed in combination the embodiments of the disclosure may be directly embodied to be executed and accomplished by a hardware processor or executed and accomplished using a combination of hardware and software modules in the processor. The software module may be located in a mature storage medium in the art, such as an RAM, a flash memory, an ROM, a Programmable ROM (PROM), an Electrically EPROM (EEPROM) or a register. The storage medium is located in the memory 540. The processor 530 reads information from the memory 540 and completes the operations of the foregoing methods in combination with the hardware of the processor. In order to avoid repetition, the above will not be elaborated herein.

In one implementation, the sending unit 320 in the terminal device 300 may be implemented by the output interface 520 in FIG. 7, the processing unit 310 in the terminal device 300 may be implemented by the processor 530 in FIG. 7, and the receiving unit 330 in the terminal device 300 may be implemented by the input interface 510 in FIG. 7.

Figure 8:
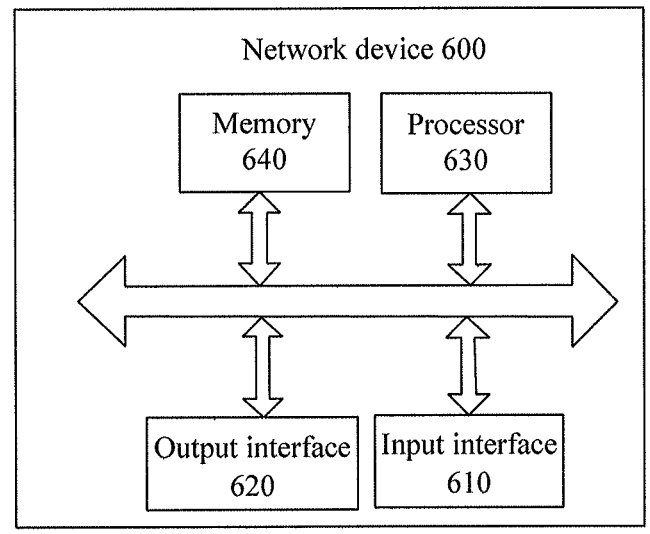
FIG. 8 illustrates another schematic block diagram of a network device for data transmission according to an embodiment of the disclosure.

As illustrated in FIG. 8, an embodiment of the disclosure further provides a network device 600 for data transmission. The network device 600 may be the network device 400 in FIG. 6, and may be configured to execute operations of the network device corresponding to the method 200 in FIG. 4. The network device 600 includes an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program, instruction or code in the memory 640 to control the input interface 610 to receive a signal, control the output interface 620 to send a signal and complete operations in the above method embodiments.

Therefore, the network device for data transmission provided by this embodiment of the disclosure may dynamically switch the transmission manners of the PDCP PDU, such that the resource utilization rate and the data transmission reliability can be balanced well.

In this embodiment of the disclosure, the processor 630 may be a Central Processing Unit (CPU). The processor 630 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 640 may include a Read Only Memory (ROM) and a Random Access Memory (RAM) and provides instructions and data for the processor 630. A part of the memory 640 may further include a nonvolatile RAM. For example, the memory 640 may further store information on a device type.

During an implementation process, the operations of the above methods may be accomplished by an integrated logic circuit of hardware in the processor 630 or an instruction in a software form. The operations of the methods disclosed in combination the embodiments of the disclosure may be directly embodied to be executed and accomplished by a hardware processor or executed and accomplished using a combination of hardware and software modules in the processor. The software module may be located in a mature storage medium in the art, such as an RAM, a flash memory, an ROM, a PROM, an EEPROM or a register. The storage medium is located in the memory 640. The processor 630 reads information from the memory 640 and completes the operations of the foregoing methods in combination with the hardware of the processor. In order to avoid repetition, the above will not be elaborated herein.

In one implementation, the processing unit 410 in the network device 400 may be implemented by the processor 630 in FIG. 8, and the sending unit 420 may be implemented by the output interface 620 in FIG. 8.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may make reference to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, an ROM, an RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, comprising:
   determining, by a first terminal device, a transmission manner of a packet data convergence protocol (PDCP) protocol data unit (PDU) to be sent, the transmission manner comprising a data duplication transmission manner or a single-link transmission manner;
   receiving, by the first terminal device, indication information sent by a second terminal device or a network device, the indication information being used for indicating that a physical layer carrier, to which the PDCP PDU is mapped, is updated; and
   sending, by the first terminal device, the PDCP PDU to the second terminal device or the network device through the updated physical layer carrier according to the transmission manner of the PDCP PDU.

2. The method of claim 1, wherein determining, by the first terminal device, the transmission manner of the PDCP PDU to be sent comprises:
   determining, by the first terminal device, the transmission manner of the PDCP PDU according to channel quality information of at least one link;
   wherein the channel quality information of the at least one link comprises a number of times of retransmission scheduling on the at least one link within a first time period, a number of times of continuous initial transmission scheduling on the at least one link within a second time period or a modulation and coding scheme (MCS) value of the at least one link; and
   determining, by the first terminal device, the transmission manner of the PDCP PDU according to the channel quality information of the at least one link comprises:
   determining, by the first terminal device, the transmission manner of the PDCP PDU according to the number of times of retransmission scheduling on the at least one link within the first time period, the number of times of continuous initial transmission scheduling on the at least one link within the second time period or the MCS value of the at least one link.

3. The method of claim 2, wherein determining, by the first terminal device, the transmission manner of the PDCP PDU according to the number of times of retransmission scheduling on the at least one link within the first time period comprises:
- in condition that the number of times of retransmission scheduling on any of the at least one link is less than or equal to a first threshold, determining, by the first terminal device, the transmission manner of the PDCP PDU as the single-link transmission manner; or
- in condition that the number of times of retransmission scheduling on each of the at least one link is greater than a first threshold, determining, by the first terminal device, the transmission manner of the PDCP PDU as the data duplication transmission manner.

4. The method of claim 2, wherein determining, by the first terminal device, the transmission manner of the PDCP PDU according to the number of times of continuous initial transmission scheduling on the at least one link within the second time period comprises:
- in condition that the number of times of continuous initial transmission scheduling on any of the at least one link is greater than or equal to a second threshold, determining, by the first terminal device, the transmission manner of the PDCP PDU as the single-link transmission manner; or
- in condition that the number of times of continuous initial transmission scheduling on each of the at least one link is less than a second threshold, determining, by the first terminal device, the transmission manner of the PDCP PDU as the data duplication transmission manner.

5. The method of claim 2, wherein determining, by the first terminal device, the transmission manner of the PDCP PDU according to the MCS value of the at least one link comprises:
- in condition that the MCS value of any of the at least one link is greater than or equal to a third threshold, determining, by the first terminal device, the transmission manner of the PDCP PDU as the single-link transmission manner; or
- in condition that the MCS value of each of the at least one link is less than a third threshold, determining, by the first terminal device, the transmission manner of the PDCP PDU as the data duplication transmission manner.

6. The method of claim 1, further comprising:
receiving, by the first terminal device, first indication information sent by the second terminal device or the network device, the first indication information being used for indicating the transmission manner of the PDCP PDU; and
determining, by the first terminal device, the transmission manner of the PDCP PDU comprises:
determining, by the first terminal device, the transmission manner of the PDCP PDU according to the first indication information.

7. The method of claim 6, further comprising:
receiving, by the first terminal device, second indication information sent by the second terminal device or the network device, the second indication information being the indication information and further being used for indicating a link for transmission of the PDCP PDU; and
determining, by the first terminal device, the link for transmission of the PDCP PDU according to the second indication information.

8. A method for data transmission, comprising:
determining, by a network device, a transmission manner of a packet data convergence protocol (PDCP) protocol data unit (PDU) of a first terminal device, the transmission manner comprising a data duplication transmission manner or a single-link transmission manner; and
sending, by the network device, first indication information to the first terminal device, the first indication information being used for indicating the transmission manner of the PDCP PDU, and
sending, by the network device, second indication information to the first terminal device, the second indication information being used for indicating that a physical layer carrier, to which the PDCP PDU is mapped, is updated.

9. The method of claim 8, wherein determining, by the network device, the transmission manner of the PDCP PDU of the first terminal device comprises:
determining, by the network device, the transmission manner of the PDCP PDU according to channel quality information of at least one link;
wherein the channel quality information of the at least one link comprises a number of times of retransmission scheduling on the at least one link within a first time period, a number of times of continuous initial transmission scheduling on the at least one link within a second time period or a modulation and coding scheme (MCS) value of the at least one link; and
determining, by the network device, the transmission manner of the PDCP PDU according to the channel quality information of the at least one link comprises:
determining, by the network device, the transmission manner of the PDCP PDU according to the number of times of retransmission scheduling on the at least one link within the first time period, the number of times of continuous initial transmission scheduling on the at least one link within the second time period or the MCS value of the at least one link.

10. The method of claim 9, wherein determining, by the network device, the transmission manner of the PDCP PDU according to the number of times of retransmission scheduling on the at least one link within the first time period comprises:
- in condition that the number of times of retransmission scheduling on any of the at least one link is less than or equal to a first threshold, determining, by the network device, the transmission manner of the PDCP PDU as the single-link transmission manner; or
- in condition that the number of times of retransmission scheduling on each of the at least one link is greater than a first threshold, determining, by the network device, the transmission manner of the PDCP PDU as the data duplication transmission manner.

11. The method of claim 9, wherein determining, by the network device, the transmission manner of the PDCP PDU according to the number of times of continuous initial transmission scheduling on the at least one link within the second time period comprises:
- in condition that the number of times of continuous initial transmission scheduling on any of the at least one link is greater than or equal to a second threshold, determining, by the network device, the transmission manner of the PDCP PDU as the single-link transmission manner; or
- in condition that the number of times of continuous initial transmission scheduling on each of the at least one link is less than a second threshold, determining, by the network device, the transmission manner of the PDCP PDU as the data duplication transmission manner.

12. The method of claim 9, wherein determining, by the network device, the transmission manner of the PDCP PDU according to the MCS value of the at least one link comprises:
in condition that the MCS value of any of the at least one link is greater than or equal to a third threshold, determining, by the network device, the transmission manner of the PDCP PDU as the single-link transmission manner; or
in condition that the MCS value of each of the at least one link is less than a third threshold, determining, by the network device, the transmission manner of the PDCP PDU as the data duplication transmission manner.

13. The method of claim 8, wherein in condition of multiple links, the method further comprises:
in condition that the transmission manner of the PDCP PDU is the single-link transmission manner, determining, by the network device, a link with optimal channel quality in the multiple links as a link for transmission of the PDCP PDU; or
in condition that the transmission manner of the PDCP PDU is the data duplication transmission manner, determining, by the network device according to a descending order of priorities of channel quality of the multiple links, several links in the multiple links as links for transmission of the PDCP PDU; and
sending, by the network device, the second indication information to the first terminal device, the second indication information further being used for indicating the link for transmission of the PDCP PDU.

14. A terminal device for data transmission, wherein the terminal device comprises a first terminal device and the first terminal device comprises:
a processor, adapted to determine a transmission manner of a packet data convergence protocol (PDCP) protocol data unit (PDU), the transmission manner comprising a data duplication transmission manner or a single-link transmission manner;
a receiving unit, adapted to receive indication information sent by a second terminal device or a network device, the indication information being used for indicating that a physical layer carrier, to which the PDCP PDU is mapped, is updated; and
an output interface, adapted to send, according to the transmission manner of the PDCP PDU, the PDCP PDU to the second terminal device or the network device through the updated physical layer carrier.

15. The terminal device of claim 14, wherein the processor is adapted to:
determine the transmission manner of the PDCP PDU according to channel quality information of at least one link;
wherein the channel quality information of the at least one link comprises a number of times of retransmission scheduling on the at least one link within a first time period, a number of times of continuous initial transmission scheduling on the at least one link within a second time period or a modulation and coding scheme (MCS) value of the at least one link, and the processor is adapted to:
determine the transmission manner of the PDCP PDU according to the number of times of retransmission scheduling on the at least one link within the first time period, the number of times of continuous initial transmission scheduling on the at least one link within the second time period or the MCS value of the at least one link.

16. The terminal device of claim 15, wherein the processor is adapted to:
determine, in condition that the number of times of retransmission scheduling on any of the at least one link is less than or equal to a first threshold, the transmission manner of the PDCP PDU as the single-link transmission manner; or
determine, in condition that the number of times of retransmission scheduling on each of the at least one link is greater than a first threshold, the transmission manner of the PDCP PDU as the data duplication transmission manner.

17. The terminal device of claim 15, wherein the processor is adapted to:
determine, in condition that the number of times of continuous initial transmission scheduling on any of the at least one link is greater than or equal to a second threshold, the transmission manner of the PDCP PDU as the single-link transmission manner; or
determine, in condition that the number of times of continuous initial transmission scheduling on each of the at least one link is less than a second threshold, the transmission manner of the PDCP PDU as the data duplication transmission manner.

18. The terminal device of claim 15, wherein the processor is adapted to:
determine, in condition that the MCS value of the at least one link is greater than or equal to a third threshold, the transmission manner of the PDCP PDU as the single-link transmission manner; or
determine, in condition that the MCS value of each of the at least one link is less than a third threshold, the transmission manner of the PDCP PDU as the data duplication transmission manner.

19. The terminal device of claim 14, further comprising:
an input interface, adapted to receive first indication information sent by the second terminal device or the network device, the first indication information being used for indicating the transmission manner of the PDCP PDU; and
the processor is adapted to:
determine the transmission manner of the PDCP PDU according to the first indication information.

20. The terminal device of claim 19, wherein
the input interface is further adapted to:
receive second indication information sent by the second terminal device or the network device, the second indication information being the indication information and further being used for indicating a link for transmission of the PDCP PDU; and
the processor is adapted to:
determine the link for transmission of the PDCP PDU according to the second indication information.

21. A network device for data transmission, comprising:
a processor, adapted to determine a transmission manner of a packet data convergence protocol (PDCP) protocol data unit (PDU) of a first terminal device, the transmission manner comprising a data duplication transmission manner or a single-link transmission manner;
an output interface, adapted to send first indication information to the first terminal device, the first indication information being used for indicating the transmission manner of the PDCP PDU, and further adapted to send second indication information to the first terminal device, the second indication information being used for indicating that a physical layer carrier, to which the PDCP PDU is mapped, is updated.

22. The network device of claim 21, wherein the processor is adapted to:
- determine the transmission manner of the PDCP PDU according to channel quality information of at least one link;
- wherein the channel quality information of the at least one link comprises a number of times of retransmission scheduling on the at least one link within a first time period, a number of times of continuous initial transmission scheduling on the at least one link within a second time period or a Modulation and Coding Scheme (MCS) value of the at least one link, and the processor is adapted to:
- determine the transmission manner of the PDCP PDU according to the number of times of retransmission scheduling on the at least one link within the first time period, the number of times of continuous initial transmission scheduling on the at least one link within the second time period or the MCS value of the at least one link.

23. The network device of claim 22, wherein the processor is adapted to:
- determine, in condition that the number of times of retransmission scheduling on any of the at least one link is less than or equal to a first threshold, the transmission manner of the PDCP PDU as the single-link transmission manner; or
- determine, in condition that the number of times of retransmission scheduling on each of the at least one link is greater than a first threshold, the transmission manner of the PDCP PDU as the data duplication transmission manner.

24. The network device of claim 22, wherein the processor is adapted to:
- determine, in condition that the number of times of continuous initial transmission scheduling on any of the at least one link is greater than or equal to a second threshold, the transmission manner of the PDCP PDU as the single-link transmission manner; or
- determine, in condition that the number of times of continuous initial transmission scheduling on each of the at least one link is less than a second threshold, the transmission manner of the PDCP PDU as the data duplication transmission manner.

25. The network device of claim 22, wherein the processor is adapted to:
- determine, in condition that the MCS value of any of the at least one link is greater than or equal to a third threshold, the transmission manner of the PDCP PDU as the single-link transmission manner; or
- determine, in condition that the MCS value of each of the at least one link is less than a third threshold, the transmission manner of the PDCP PDU as the data duplication transmission manner.

26. The network device of claim 21, wherein in condition of multiple links,
- the processor is further adapted to:
- determine, in condition that the transmission manner of the PDCP PDU is the single-link transmission manner, a link with optimal channel quality in the multiple links as a link for transmission of the PDCP PDU; or
- determine, in condition that the transmission manner of the PDCP PDU is the data duplication transmission manner, several links in the multiple links as links for transmission of the PDCP PDU according to a descending order of priorities of channel quality of the multiple links; and
- the output interface is further adapted to:
- send the second indication information to the first terminal device, the second indication information further being used for indicating the link for transmission of the PDCP PDU.

* * * * *